United States Patent
Vijil et al.

(10) Patent No.: US 10,636,449 B2
(45) Date of Patent: Apr. 28, 2020

(54) DYNAMIC GENERATION OF VIDEOS BASED ON EMOTION AND SENTIMENT RECOGNITION

(71) Applicant: International Business Machines Corporation, Armonk, NY (US)

(72) Inventors: Enara C. Vijil, Milwood, NY (US); Seema Nagar, Bangalore (IN); Srikanth G. Tamilselvam, Chennai (IN); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 15/804,358

(22) Filed: Nov. 6, 2017

(65) Prior Publication Data
US 2019/0139575 A1    May 9, 2019

(51) Int. Cl.
*G11B 27/031*    (2006.01)
*G06K 9/00*    (2006.01)
(Continued)

(52) U.S. Cl.
CPC ........ *G11B 27/031* (2013.01); *G06K 9/00758* (2013.01); *G11B 27/10* (2013.01);
(Continued)

(58) Field of Classification Search
CPC ......... H04N 21/44218; H04N 21/8549; H04N 21/854; G06F 16/435; G06F 16/436;
(Continued)

(56) References Cited

U.S. PATENT DOCUMENTS 6,700,640 B2    3/2004    Morley et al.
7,073,193 B2    7/2006    Marsh
(Continued)

FOREIGN PATENT DOCUMENTS

| WO | 2014044503 A1 | 3/2014 | |
|---|---|---|---|
| WO | 2015121451 A1 | 8/2015 | |
| WO | WO-2017209482 A1 * | 12/2017 | ............. G06Q 30/02 |

OTHER PUBLICATIONS

Hou et al., "Predicting Movie Trailer Viewer's "Like/Dislike" via Learned Shot Editing Patterns", IEEE Transactions of Affective Computing, vol. 7, No. 1, Jan.-Mar. 2016, 16 pages.
(Continued)

*Primary Examiner* — David E Harvey
(74) *Attorney, Agent, or Firm* — Edward J. Wixted, III; Brian M. Restauro (57) ABSTRACT

Metadata about a movie is retrieved. The metadata includes a plurality of associated viewer responses from at least one previous audience viewing of the video. The plurality of associated viewer responses from the at least one previous audience viewing are associated with one or more segments of the video. A segment of the video associated with a type of viewer reaction based on emotion and sentiment recognition is identified. Additional media content based on the identified video segment is retrieved. A segment of the additional media content that exceeds a threshold of similarity with the segment of the video is determined. A video clip that includes the segment of the additional media content is created.

17 Claims, 3 Drawing Sheets

(51) Int. Cl.
  *H04N 21/854* (2011.01)
  *G11B 27/10* (2006.01)
  *H04N 21/442* (2011.01)
  *G11B 27/28* (2006.01)

(52) U.S. Cl.
  CPC ....... *G11B 27/28* (2013.01); *H04N 21/44218* (2013.01); *H04N 21/854* (2013.01)

(58) Field of Classification Search
  CPC ..... G06F 16/437; G11B 27/031; G11B 27/10; G06K 9/00758
  See application file for complete search history.

(56) References Cited

U.S. PATENT DOCUMENTS

| | | | |
|---|---|---|---|
| 8,171,411 | B1 | 5/2012 | Ungar et al. |
| 9,002,175 | B1 | 4/2015 | Raj |
| 9,077,460 | B2 | 7/2015 | Ramanathan et al. |
| 9,563,901 | B2 | 2/2017 | Fleischman et al. |
| 2004/0194128 | A1 | 9/2004 | McIntyre et al. |
| 2007/0250847 | A1 | 10/2007 | Gastwirth |
| 2009/0013350 | A1 | 1/2009 | Ohlfs et al. |
| 2010/0198773 | A1 | 8/2010 | Wallisch |
| 2013/0254787 | A1 | 9/2013 | Cox et al. |
| 2014/0298364 | A1* | 10/2014 | Stepanov ............... H04N 21/25 725/10 |
| 2015/0172787 | A1 | 6/2015 | Geramifard |
| 2016/0048595 | A1 | 2/2016 | VanBlon et al. |
| 2017/0055014 | A1 | 2/2017 | Bou Balust et al. |
| 2019/0139575 | A1* | 5/2019 | Vijil ..................... G11B 27/031 |

OTHER PUBLICATIONS

Oh et al., "Viewer Engagement in Movie Trailers and Box Office Revenue", 2015 48th Hawaii International Conference on System Sciences, © 2015 IEEE, 7 pages.

Johnston et al., "Watching the Trailers: Researching the Film Trailer Audience", Participations Journal of Audience & Reception Studies, vol. 13, Issue 2, Nov. 2016, 30 pages.

Iida et al., "A Study on Effectiveness of Movie Trailers Boosting Customers' Appreciation Desire: A Customer Science Approach Using Statistics and GSR", Journal of Business & Economic Research, vol. 10, No. 6, Jun. 2012, © 2012 The Clute Institute, 10 pages. <http://www/cluteinstitute.com?>.

Perkins, "Neural Networks Model Audience Reactions to Movies", Caltech, Jul. 21, 2017, http://m.caltech.edu/news/neural-networks-model-audience-reactions-movies-79098, Printed Sep. 12, 2017, 2 pages.

McManus, "'Cutting Edge' Review: 'Smart, fast-moving, amusing, even a little moving on occasion—welcome back Brendan O'Connor'", Cutting Edge Review, May 19, 2016, 7 pages, <http://www.independent.ie/entertainment/television/tv-reviews/cutting-edge-review-smart-fastmoving-amusing-even-a-little-moving-on-occasion-welcome-back-brendan-oconnor-34728784.html>.

Derene, "Samsung, LG, and Vizio smart TVs are recording- and sharing data about—everything you watch Consumer Reports investigates the information brokers who want to turn your viewing habits into cash", Consumer Reports, Published: Feb. 27, 2015, 4 pages, <http://www.consumerreports.org/cro/news/2015/02/samsung-lg-vizio-smart-tvs-watch-everything-you-watch/index.htm>.

* cited by examiner

DYNAMIC GENERATION OF VIDEOS BASED ON EMOTION AND SENTIMENT RECOGNITION

BACKGROUND

The present invention relates generally to the field of videos, and more particularly to dynamically generating videos based on emotion and sentiment recognition.

The use of video advertising is widespread. For example, movie trailers are a means of advertising upcoming feature movies and are effective advertising because several movie trailers can be presented to a captive audience that is waiting to watch a different movie in a theater. Movie trailers can also be played during the intermission of a long movie, at the end of a given movie (before or after the movie credits), and in between movies of a double or triple feature.

SUMMARY OF THE INVENTION

Embodiments of the present invention include an approach for dynamically generating video clips based on audience emotion and sentiment response. In one embodiment, metadata about a video is retrieved. The metadata includes a plurality of associated viewer responses from at least one previous audience viewing of the video. The plurality of associated viewer responses from the at least one previous audience viewing are associated with one or more segments of the video. A segment of the video associated with a type of viewer reaction based on emotion and sentiment recognition is identified. Additional media content based on the identified video segment is retrieved. A segment of the additional media content that exceeds a threshold of similarity with the segment of the video is determined. A video clip that includes the segment of the additional media content is created.

DETAILED DESCRIPTION

Embodiments of the present invention provide for dynamically generating videos based on emotion and sentiment recognition. One example of videos that can be dynamically generated in this manner are movie trailers. Currently, the movie trailers presented to an audience do not take into consideration the make-up of the audience beyond the fact that prior to a comedy movie, funny movie trailers may be shown (i.e., the genre of the current movie may be considered for determining the appropriate movie trailers to present to the audience). Without tapping directly into the audience, or another audience that has viewed the same movie the current audience is about to watch, advertisers risk presenting movie trailers for upcoming movies that may not appeal to the current audience.

Embodiments of the present invention recognize that there is an approach for dynamically generating videos based on emotion and sentiment recognition. In an embodiment, audience emotion and sentiment responses to specific scenes, actors, visuals, dialogue, etc. in a movie M are determined and used to dynamically create movie trailers for other movies that will appeal to an audience watching the same movie M.

The present invention will now be described in detail with reference to the Figures.

Figure 1:
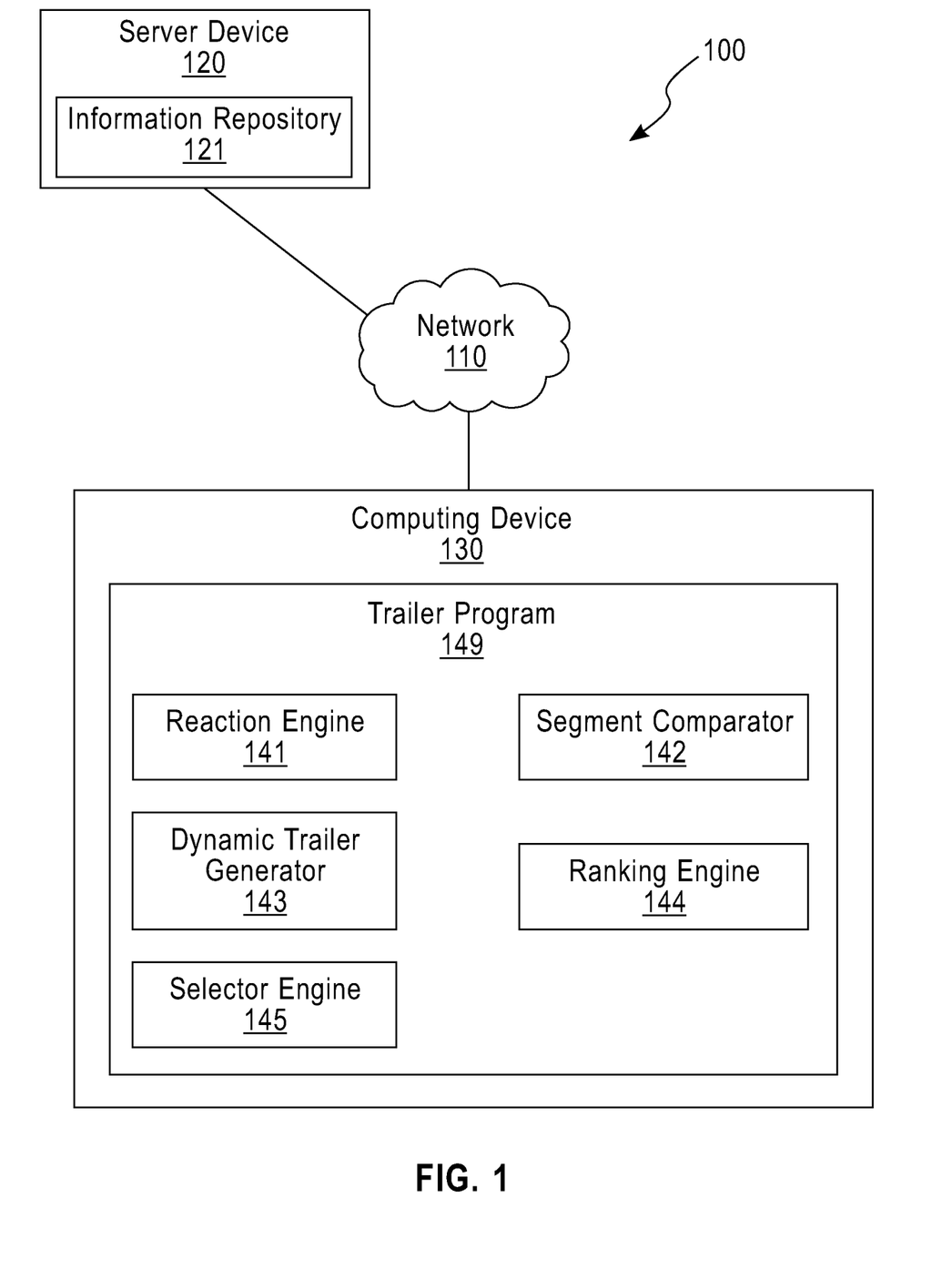
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes server device 120 and computing device 130, connected to network 110. In example embodiments, computing environment 100 may include other computing devices (not shown in FIG. 1) such as smart watches, cell phones, smartphones, wearable technology, phablets, tablet computers, laptop computers, desktop computers, other computer servers or any other computer system known in the art, interconnected to server device 120 and computing device 130, over network 110.

In an embodiment of the present invention, server device 120 and computing device 130 connect to network 110, which enables server device 120 and computing device 130 to access other computing devices and/or data not directly stored on server device 120 and computing device 130. Network 110 may be, for example, a short-range, low power wireless connection, a local area network (LAN), a telecommunications network, a wide area network (WAN) such as the Internet, or any combination of the three, and include wired, wireless, or fiber optic connections. Network 110 may include one or more wired and/or wireless networks that are capable of receiving and transmitting data, voice, and/or video signals, including multimedia signals that include voice, data, and video information. In general, network 110 can be any combination of connections and protocols that will support communications between server device 120 and computing device 130, and any other computing devices connected to network 110, in accordance with embodiments of the present invention. In an embodiment, data received by another computing device (not shown in FIG. 1) in computing environment 100 may be communicated to server device 120 and computing device 130 via network 110.

According to embodiments of the present invention, server device 120 and computing device 130 may be a laptop, tablet, or netbook personal computer (PC), a desktop computer, a personal digital assistant (PDA), a smartphone, a phablet, a smart watch, a fitness tracker or any other wearable technology, a smart television, a smart digital video recorder, a security camera, a smart automobile, or any other programmable electronic device capable of communicating with any other computing device within computing environment 100. In an embodiment, computing environment 100 includes any number of server device 120 and computing device 130.

In certain embodiments, server device 120 and/or computing device 130 represent a computer system utilizing clustered computers and components (e.g., database server computers, application server computers, etc.) that act as a single pool of seamless resources when accessed by elements of computing environment 100. In general, server device 120 and computing device 130 are representative of any electronic device or combination of electronic devices capable of executing computer readable program instructions. Server device 120 and computing device 130 may include components as depicted and described in further detail with respect to FIG. 3, in accordance with embodiments of the present invention.

According to an embodiment of the present invention, server device 120 includes information repository 121. In an embodiment, information repository 121 may be storage that may be written to and/or read by trailer program 149. In one embodiment, information repository 121 resides on computing device 130. In another embodiment, information repository 121 resides on server device 120. In yet other embodiments, information repository 121 may reside on any other device (not shown in FIG. 1) in computing environment 100, in cloud storage or on another computing device accessible via network 110. In yet another embodiment, information repository 121 may represent multiple storage devices within computing device 130. Examples of data stored to information repository 121 include audience emotion and sentiment responses to one or more movies and movie trailers, existing full length movies and associated movie trailers, and dynamically generated movie trailers created by trailer program 149.

In an embodiment, information repository 121 may be implemented using any volatile or non-volatile storage media for storing information, as known in the art. For example, information repository 121 may be implemented with a tape library, optical library, one or more independent hard disk drives, multiple hard disk drives in a redundant array of independent disks (RAID), solid-state drives (SSD), or random-access memory (RAM). Similarly, information repository 121 may be implemented with any suitable storage architecture known in the art, such as a relational database, an object-oriented database, or one or more tables. In an embodiment of the present invention, trailer program 149, reaction engine 141, segment comparator 142, dynamic trailer generator 143, ranking engine 144, selector engine 145, and any other programs and applications (not shown in FIG. 1) operating on computing device 130 may store, read, modify, or write data to information repository 121.

According to an embodiment of the present invention, computing device 130 includes trailer program 149. In the embodiment, trailer program 149 includes reaction engine 141, segment comparator 142, dynamic trailer generator 143, ranking engine 144, and selector engine 145. In another embodiment, computing device 130 includes reaction engine 141, segment comparator 142, dynamic trailer generator 143, ranking engine 144, and selector engine 145 which are separate from trailer program 149. In yet another embodiment, some of reaction engine 141, segment comparator 142, dynamic trailer generator 143, ranking engine 144, and selector engine 145 are included with trailer program 149 while others of reaction engine 141, segment comparator 142, dynamic trailer generator 143, ranking engine 144, and selector engine 145 are separate from trailer program 149.

In an embodiment, reaction engine 141 is a program, a subprogram of a larger program, an application, a plurality of applications, or mobile application software, which functions to determine the reaction (i.e., emotion, sentiment, etc.) of at least one viewer to at least one specific scene in a movie. A program is a sequence of instructions written by a programmer to perform a specific task. In an embodiment, viewer reaction is determined by translating images of the faces of viewers in the audience into numerical data using an algorithm called factorized variational autoencoders (FVAEs) and the numerical data is stored to information repository 121 for use. In the embodiment, the FVAEs are trained to incorporate metadata (i.e., relevant information about the data being analyzed). The numerical data is used to represent specific facial features such as smiling, how wide open eyes are, and whether a mouth is open or closed. The incorporated metadata allows the FVAE algorithm to connect the numerical data to other pertinent data in order to assess the emotion and sentiment response of the audience. In another embodiment, viewer reaction is determined in real time for use prior to storage to memory. According to an embodiment of the present invention, reaction engine 141 determines reactions of a viewer cohort with respect to specific movie content by (i) compiling viewer responses during the viewing of a movie, (ii) determining the movie content (e.g., actor(s), scene, dialogue, visuals, etc.) associated with viewer responses, (iii) aggregating the viewer responses into cohorts (e.g., viewer age, gender, ethnicity, etc.) and separating responses by cohorts (e.g., responses associated with male teenagers), and (iv) generating movie segments in time (i.e., from a first time to a second time in the movie) associated with specific scenes and like responses (e.g., male teenagers generally laughed when watching the car wash scene). In an embodiment, the movie segments are ranked across multiple viewings of a given movie to determine an order. In one embodiment, the ranking is a simple count. In another embodiment, the individual rankings are weighted (e.g., in an action movie involving robots, cohorts under the age of twenty-five are weighted twenty percent higher than older cohorts).

According to an embodiment of the present invention, segment comparator 142 is a program, a subprogram of a larger program, an application, a plurality of applications, or mobile application software, which functions to compare two or more movie segments. A program is a sequence of instructions written by a programmer to perform a specific task. According to an embodiment of the present invention, segment comparator 142 compares the ranked movie segments generated by reaction engine 141 to determine similar segments based on viewer response to the segment content (e.g., actor/actress information such as age, ethnicity, etc.; type of scene such as action, romantic, suspense, etc.; visuals such as city, country, mountains, lake, etc.; transitions such as indoors to outdoors, on a boat to off a boat, etc.; and emotion such as happy, sad, traumatic, etc.).

According to an embodiment of the present invention, dynamic trailer generator 143 is a program, a subprogram of a larger program, an application, a plurality of applications, or mobile application software, which functions to generate movie trailers based on the segments compared by segment comparator 142. A program is a sequence of instructions written by a programmer to perform a specific task. In an embodiment, dynamic trailer generator 143 extracts scenes that match as determined by segment comparator 142. In the embodiment, the matching scenes are taken from (i) the movie that a trailer is being created for and (ii) a movie that is currently being viewed and has also been viewed in the past during which viewer response is determined/analyzed by reaction engine 141. According to an embodiment of the present invention, dynamic trailer generator 143 creates movie trailers based on the results from segment comparator 142. In an embodiment, the most compared segments are used to dynamically generate a movie trailer.

According to an embodiment of the present invention, ranking engine 144 is a program, a subprogram of a larger program, an application, a plurality of applications, or mobile application software, which functions to rank the relevance of the generated movie trailers with respect to the movie used to generate the movie trailer. A program is a sequence of instructions written by a programmer to perform a specific task. According to an embodiment of the present invention, ranking engine 144 creates a ranking for each generated movie trailer based on the reactions of the viewers. For example, three movie trailers are generated from a movie. The first movie trailer generates a response in half of the audience, the second movie trailer generates a response in a third of the audience, and the third movie trailer generates a response in two-thirds of the audience; therefore, the three movie trailers are ranked, from highest to lowest, three, one, and two.

According to an embodiment of the present invention, selector engine 145 is a program, a subprogram of a larger program, an application, a plurality of applications, or mobile application software, which functions to select the highest ranked movie trailers for presenting to an audience. A program is a sequence of instructions written by a programmer to perform a specific task. In an embodiment, the movie trailers are selected by rank and are presented to an audience in a movie theater at the start of a movie, during an intermission of the movie, before or after the credits of the movie, or before a double or triple feature movie. In another embodiment, the ranked trailers are associated with individuals in the audience through the smartphones, smart watches, and other computing devices owned by the individuals. In this embodiment, the trailers are presented to the individuals via the smartphones, smart watches, and other computing devices owned by the individuals at some other time when the individuals are no longer in the theater.

According to embodiments of the present invention, trailer program 149 is a program, a subprogram of a larger program, an application, a plurality of applications, or mobile application software, which functions to dynamically generate videos, such as movie trailers, based on audience emotion and sentiment response. In an embodiment, trailer program 149 generates trailers for full length feature films (i.e., movies). In another embodiment, trailer program 149 generates trailers for television shows. In yet another embodiment, trailer program 149 generates trailers for any other type of media that is presented to an audience where the audience response is monitored. A program is a sequence of instructions written by a programmer to perform a specific task. In an embodiment, trailer program 149 uses results from reaction engine 141, segment comparator 142, dynamic trailer generator 143, ranking engine 144, and selector engine 145 to dynamically generate a movie trailer based on audience emotion and sentiment response. In another embodiment, trailer program 149 uses results from only some of reaction engine 141, segment comparator 142, dynamic trailer generator 143, ranking engine 144, and selector engine 145 to dynamically generate a movie trailer based on audience emotion and sentiment response. Trailer program 149 may run by itself but may be dependent on system software (not shown in FIG. 1) to execute. In one embodiment, trailer program 149 functions as a stand-alone program residing on computing device 130. In another embodiment, trailer program 149 may work in conjunction with other programs, applications, etc., found in computing environment 100. In yet another embodiment, trailer program 149 may be found on server device 120 or on other computing devices (not shown in FIG. 1) in computing environment 100, which are interconnected to computing device 130 via network 110.

Figure 2:
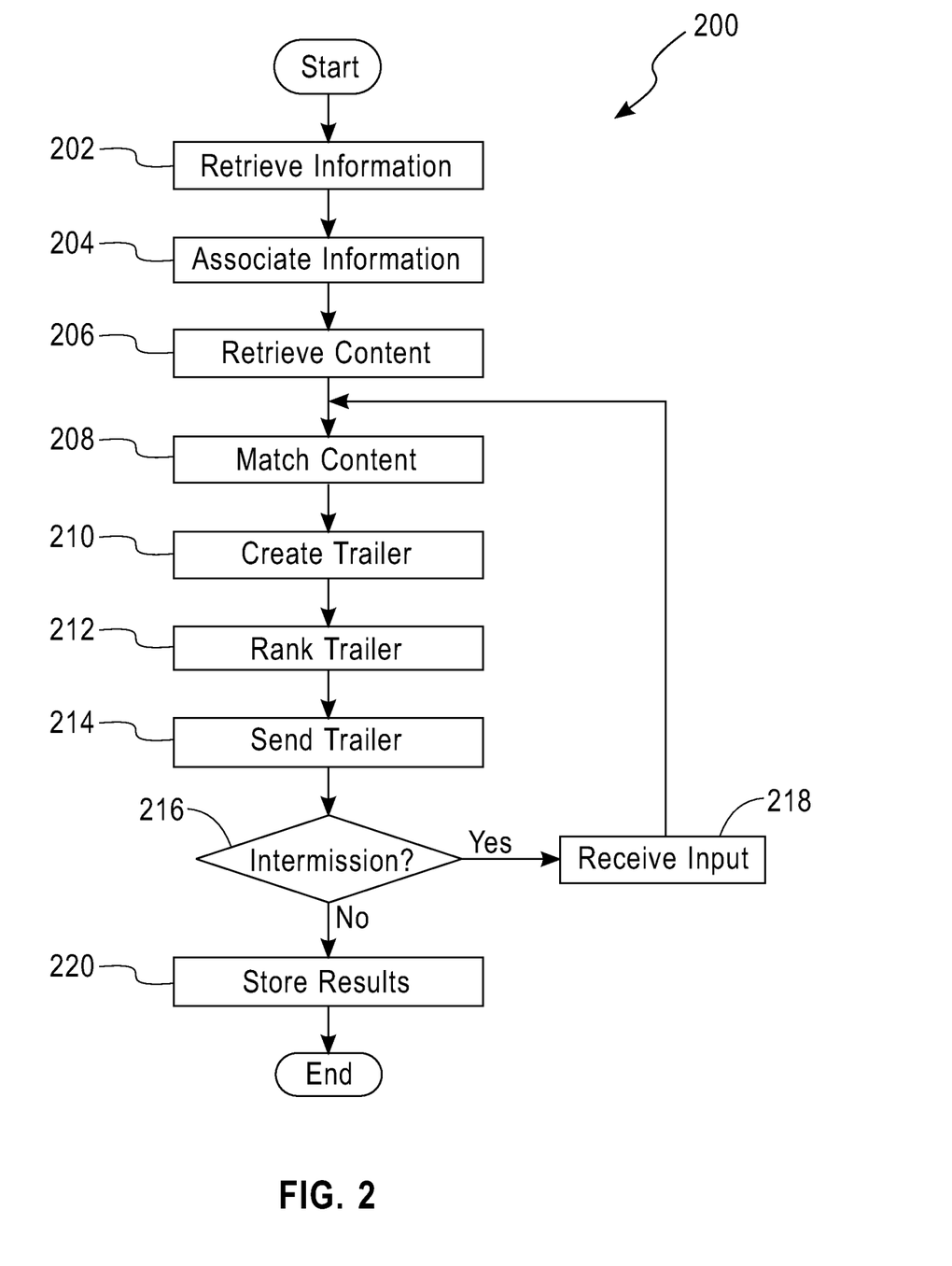
FIG. 2 depicts a flowchart of a program for dynamically generating videos based on emotion and sentiment recognition, in accordance with an embodiment of the present invention.

FIG. 2 is a flowchart of workflow 200 depicting an approach for dynamically generating videos, such as movie trailers, based on audience emotion and sentiment response. In one embodiment, the method of workflow 200 is performed by trailer program 149. In an alternative embodiment, the method of workflow 200 may be performed by any other program working with trailer program 149. In an embodiment, a user may invoke workflow 200 upon opening an application on server device 120. In an alternative embodiment, a user may invoke workflow 200 upon accessing trailer program 149.

In an embodiment, trailer program 149 retrieves information (step 202). In other words, trailer program 149 retrieves available information from a memory regarding a specific movie (M) that has been previously viewed by other audiences one or more times. In an embodiment, the retrieved information was created by reaction engine 141 included in trailer program 149. In an embodiment, the retrieved information includes the viewer emotion and sentiment responses as determined by the factorized variational autoencoders (FVAEs) algorithm such as happiness, sadness, fear, anger, surprise, anticipation, trust, and disgust from one or more past showings of movie M associated with certain movie content factors in the movie M. In the embodiment, movie content factors include actor gender/age/ethnicity/popularity/etc., movie dialogue/tone/emotion, scene type, scene transition, movie visuals, and the like found in the movie M. According to an embodiment of the present invention, viewer responses are collected from smart devices (e.g., smartphones, smart watches, etc.) of the viewers, wearable devices such as activity trackers worn by the viewers, and the Internet of Things devices (e.g., interconnected infrared cameras, monitors, sensors, etc.) observing the viewers. In an embodiment, trailer program 149 retrieves the available information generated by past audiences regarding the specific movie M, which is going to be viewed by a current audience, from information repository 121 on server device 120. For example, information is retrieved regarding the action movie "Fast".

In an embodiment, trailer program 149 associates information (step 204). In other words, trailer program 149 associates the retrieved factor information with the corresponding viewer responses. In an embodiment, the association indicates how strongly a particular viewer response is related to a particular movie content factor. In an embodiment, trailer program 149 associates the viewer response to movie M to particular movie content factors. For example, in the movie "Fast", the following correlations were found: a high percentage of the male viewers, regardless of age, liked the chase scene while only "younger" females enjoyed the chase scene, males liked the fight scene but females did not, only "older" males enjoyed the dinner scene, the majority of the audience liked all of the scenes that included the two dogs in the movie, teenage girls liked the beach scene that included a campfire but not the beach scene that included fishing, none of the viewers responded favorably to the funeral scene, and the scene in the park was considered to be neutral by all of the audience with the exception of the "older" females who liked the park scene.

In an embodiment, trailer program 149 retrieves content (step 206). In other words, trailer program 149 retrieves additional media content, including full length movies and movie trailers that are similar to movie M (i.e., similar genre, similar target audience, similar Motion Picture Association of America (MPAA) or other rating, similar lead actor/actress, similar FVAE data, etc.). In an embodiment, the additional media content is current (i.e., the full length movies are in release). In another embodiment, the additional media content is upcoming (i.e., the full length movies are to be released sometime in the future). In yet another embodiment, the additional media content is a combination of current and upcoming content. In yet another embodiment, the additional media content includes full length television shows and television show trailers. In an embodiment, trailer program 149 retrieves additional media content stored to information repository 121 on server device 120. For example, the following additional media content is retrieved: action movie "1" (AM1), which is currently released, action movie "2" (AM2), which is being released in one month, movie trailer "1" (TAM1), which is an existing movie trailer for AM1, movie trailer "2" (TAM2), which is an existing movie trailer for AM2, movie trailer "3" (T3), which is an existing movie trailer for an upcoming movie, and movie trailer "4" (T4), which is an existing movie trailer for another upcoming movie.

In an embodiment, trailer program 149 matches content (step 208). In other words, trailer program 149 matches (i.e., identifies) the content included in the retrieved full length movies and movie trailers to the associated factor information from movie M. In an embodiment, trailer program 149 uses segment comparator 142 to match content in segments of the retrieved content that exceeds a threshold of similarity with segments from movie M. In the embodiment, the content matched by trailer program 149 that may exceed the threshold of similarity includes movie factor information such as actors and actresses in the full length movies and movie trailers that are also found in movie M, scenes in the full length movies and the movie trailers that are similar to the scenes well-received by the audience in movie M, and scenes in the full length movies and the movie trailers that are similar to the scenes not well-received by the audience in movie M. In an embodiment, in order to match the content, trailer program 149 reviews the metadata associated with the retrieved content to identify the various factors included in the full length movies and the movie trailers. In another embodiment, trailer program 149 retrieves the factor information for the full length movies and the movie trailers from a database of factors. In an embodiment, trailer program 149 matches the associated information from movie M to the retrieved full length movies and movie trailers. For example, since most of the audience liked all of the scenes with the two dogs in movie M, scenes with dogs from AM1, AM2, TAM1, TAM2, T3, and T4 are matched. Further, since a high percentage of male viewers liked the chase and fight scenes and younger females also liked the chase scene, similar action scenes from AM1, AM2, TAM1, TAM2, T3, and T4 are matched. Other scenes from movie M were considered neutral (i.e., enjoyed by only some of the audience) with the exception of the funeral scene which was disliked by the audience so no similar scene from AM1, AM2, TAM1, TAM2, T3, and T4 was matched.

In an embodiment, trailer program 149 creates trailer (step 210). In other words, trailer program 149 uses the matched content between movie M and AM1, AM2, TAM1, TAM2, T3, and T4 to dynamically create movie trailers for AM1 and AM2. In an embodiment, trailer program 149 uses dynamic trailer generator 143 to create the movie trailers. In an embodiment, trailer program 149 creates the movie trailers by stitching together the matched segments of AM1 into a movie trailer for AM1 and by stitching together the matched segments of AM2 into a movie trailer for AM2. According to an embodiment of the present invention, a dynamically generated trailer created by trailer program 149 includes one or more of the following trailer features: a single act structure, a multi-act structure, scene transitions (e.g., one or more types of cut, fade in/out, dissolve, wipe, iris, split edit, and morph), scene enhancements (e.g., white flash, fast-paced flutter cuts, double exposure, speed adjustment, and audio rises/stings/continuous low tones), multi-channel sound mix, music, voice-over narration, subtitles, a cast run (i.e., list of stars in the movie), a billing block (i.e., list of principal cast and crew), the name of the director, the name of the producer, a logo of the production company, and a logo of the film distributor. In an embodiment, the trailer features are used to stitch together the matched segments to create a cohesive trailer that tells the story of the movie from which the trailer is created.

In an embodiment, existing movie trailers for AM1 and AM2 are considered such that the movie trailers created by trailer program 149 are unique and different from the existing movie trailers TAM1 and TAM2. In an embodiment, trailer program 149 will review metadata for AM1 and AM2 and exclude content from AM1 and AM2 in the dynamically created movie trailers that has been tagged "do not use" by the owner of AM1 and AM2. In an embodiment, trailer program 149 creates a movie trailer for each of the retrieved full length movies. For example, movie trailers CTAM1 and CTAM2 are created for movies AM1 and AM2, respectively.

In an embodiment, trailer program 149 ranks trailer (step 212). In other words, trailer program 149 ranks the available movie trailers (e.g., TAM1, TAM2, CTAM1, CTAM2, T3, and T4) using the associated information from movie M and the matched content between movie M and the available movie trailers. In an embodiment, trailer program 149 uses ranking engine 144 to rank the movie trailers. In an embodiment, the movie trailer(s) with highest number of instances of matched content are ranked higher than those with fewer instances of matched content. In an embodiment, trailer program 149 ranks the available movie trailers. For example, movie trailers TAM1, TAM2, CTAM1, CTAM2, T3, and T4 are ranked as follows: CTAM2 (most instances of matched content), TAM2, CTAM1, TAM1, T4, and T3 (least instances of matched content).

In an embodiment, trailer program 149 sends trailer (step 214). In other words, trailer program 149 sends (i.e., transmits) the ranked movie trailers to a movie projector or equivalent device where the movie trailers are selected for presentation to an audience. In an embodiment, the audience is in a movie theater. In another embodiment, the audience is in a home. In yet another embodiment, the audience is in any other venue capable of presenting a movie to an audience. In an embodiment, trailer program 149 uses selector engine 145 to both send the movie trailers and select the movie trailers for presentation. In an embodiment, the ranked movie trailers are played before a movie, during intermission of the movie, at the end of the movie before the movie credits or after the movie credits, or at similar points during a double and/or triple feature presentation. In an embodiment, trailer program 149 sends the ranked movie trailers to the projection room of the theater showing movie M. For example, the following ranked movie trailers are sent: CTAM2, TAM2, CTAM1, TAM1, T4, and T3. Further, the movie trailers are presented to the audience of movie M in the ranked/sent order.

In an embodiment, trailer program 149 determines intermission (decision step 216). In other words, trailer program 149 determines whether there is an intermission or other similar break in the presentation of movie M. In an embodiment (decision step 216, YES branch), trailer program 149 determines that there is an intermission in the presentation of movie M; therefore, trailer program 149 proceeds to step 218 to receive input. In the embodiment (decision step 216, NO branch), trailer program 149 determines that there is not an intermission; therefore, trailer program 149 proceeds to step 220 to store results.

In an embodiment, trailer program 149 receives input (step 218). In other words, responsive to determining that there is an intermission, trailer program 149 receives additional input from the audience currently viewing movie M. In an embodiment, the additional input received by trailer program 149 is the viewer response information, determined by reaction engine 141, for the portion of movie M viewed by the current audience. According to an embodiment of the present invention, the additional input is used by trailer program 149 to dynamically create more movie trailers that are directly tailored to the current audience of movie M because the additional input is generated by the current audience during the presentation of the first portion of movie M. In an embodiment, after the additional information is received, trailer program 149 uses segment comparator 142, dynamic trailer generator 143, ranking engine 144, and selector engine 145 to create one or more new movie trailers, rank the movie trailers, and select the movie trailers for presentation to the audience of movie M. For example, new movie trailer NT1 is created for AM1 and new movie trailer NT2 is created for AM2.

In an embodiment, trailer program 149 stores results (step 220). In other words, responsive to determining that there is not an intermission, trailer program 149 stores the results generated by reaction engine 141, segment comparator 142, dynamic trailer generator 143, ranking engine 144, and selector engine 145 to a database in a memory. According to an embodiment of the present invention, the results are stored so that the results are available for use by trailer program 149, or other similar program, in the future. In an embodiment, trailer program 149 stores the results to information repository 121 on server device 120. For example, CTAM1, CTAM2, NT1, NT2, and the associated data used to create the four movie trailers, is stored to a database in a memory.

Figure 3:
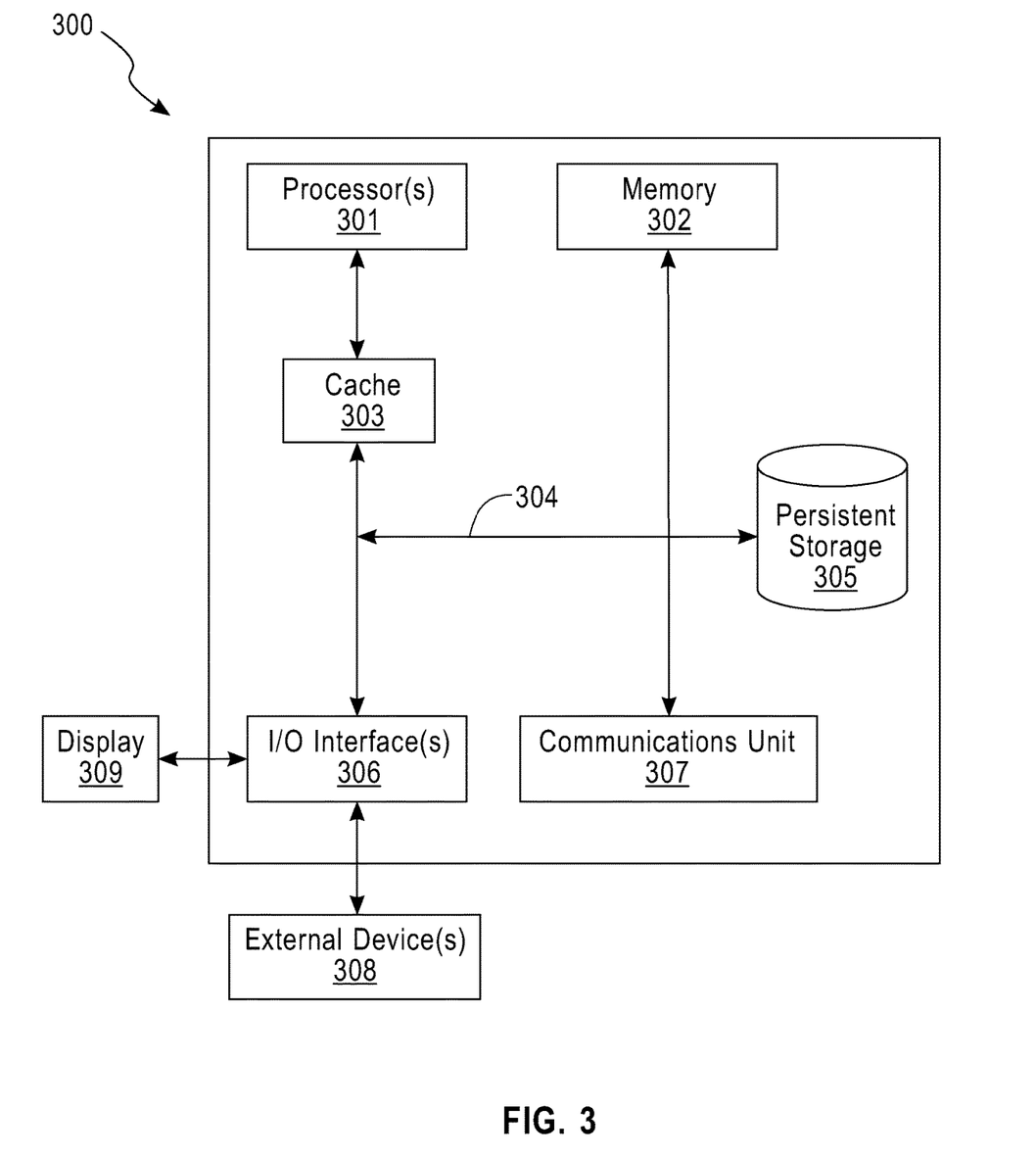
FIG. 3 depicts a block diagram of components of the computing environment of FIG. 1, in accordance with an embodiment of the present invention.

FIG. 3 depicts computer system 300, which is an example of a system that includes trailer program 149. Computer system 300 includes processor(s) 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touchscreen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:

retrieving, by one or more computer processors, information about video metadata, wherein the metadata includes a plurality of associated viewer responses from at least one previous audience viewing of the video;

receiving, by one or more computer processors, input from a current audience viewing the video, wherein the input includes current viewer emotion and sentiment responses to the video;

determining, by one or more computer processors, that there is an intermission in the video;

associating, by one or more computer processors, the plurality of associated viewer responses from the at least one previous audience viewing and the current viewer emotion and sentiment responses with one or more segments of the video;

identifying, by one or more computer processors, a segment of the video associated with a type of viewer reaction based on emotion and sentiment recognition;

retrieving, by one or more computer processors, additional media content based on the identified video segment;

determining, by one or more computer processors, a segment of the additional media content that exceeds a threshold of similarity with the segment of the video; and creating, by one or more computer processors, a video clip that includes the segment of the additional media content.

2. The method of claim 1, further comprising:

ranking, by one or more computer processors, a plurality of video clips, including the video clip, based on similarity with the segment of the video; and sending, by one or more computer processors, the ranked plurality of video clips for presentation to a current audience viewing the video.

3. The method of claim 1, further comprising:

storing, by one or more computer processors, one or more results used to create the video clip, wherein the one or more results include the retrieved information about the video, the association between viewer emotion and sentiment responses and segments of the video, the identified segment of the video associated with the type of viewer reaction, the additional media content, the segment of the additional media content that exceeds the threshold of similarity with the segment of the movie, the created video clip.

4. The method of claim 1, wherein the additional media includes a full-length movie, a movie trailer, a full-length television show, and a television show trailer.

5. The method of claim 2, further comprising:

associating, by one or more computer processors, a computing device with a user in the current audience; and sending, by one or more computer processors, the ranked plurality of video clips to the computing device of the user.

6. The method of claim 1, wherein the type of viewer emotion and sentiment reaction is selected from the group consisting of: happiness, sadness, fear, anger, surprise, anticipation, trust, and disgust.

7. A computer program product, the computer program product comprising:

one or more computer readable storage media; and program instructions stored on the one or more computer readable storage media, the program instructions comprising:

program instructions to retrieve information about video metadata, wherein the metadata includes a plurality of associated viewer responses from at least one previous audience viewing of the video;

program instructions to receive input from a current audience viewing the video, wherein the input includes current viewer emotion and sentiment responses to the video;

program instructions to determine that there is an intermission in the video;

program instructions to associate the plurality of associated viewer responses from the at least one previous audience viewing and the current viewer emotion and sentiment responses with one or more segments of the video;

program instructions to identify a segment of the video associated with a type of viewer reaction based on emotion and sentiment recognition;

program instructions to retrieve additional media content based on the identified video segment;

program instructions to determine a segment of the additional media content that exceeds a threshold of similarity with the segment of the video; and program instructions to create a video clip that includes the segment of the additional media content.

8. The computer program product of claim 7, further comprising program instructions stored on the one or more computer readable storage media, to:

rank a plurality of video clips, including the video clip, based on similarity with the segment of the video; and send the ranked plurality of video clips for presentation to a current audience viewing the video.

9. The computer program product of claim 7, further comprising program instructions stored on the one or more computer readable storage media, to:

store one or more results used to create the video clip, wherein the one or more results include the retrieved information about the video, the association between viewer emotion and sentiment responses and segments of the video, the identified segment of the video associated with the type of viewer reaction, the additional media content, the segment of the additional media content that exceeds the threshold of similarity with the segment of the movie, the created video clip.

10. The computer program product of claim 7, wherein the additional media includes a full-length movie, a movie trailer, a full-length television show, and a television show trailer.

11. The computer program product of claim 8, further comprising program instructions stored on the one or more computer readable storage media, to:

associate a computing device with a user in the current audience; and send the ranked plurality of video clips to the computing device of the user.

12. The computer program product of claim 7, wherein the type of viewer emotion and sentiment reaction is selected from the group consisting of: happiness, sadness, fear, anger, surprise, anticipation, trust, and disgust.

13. A computer system, the computer system comprising:

one or more computer processors;

one or more computer readable storage media; and program instructions stored on the one or more computer readable storage media for execution by at least one of the one or more computer processors, the program instructions comprising:

program instructions to retrieve information about video metadata, wherein the metadata includes a plurality of associated viewer responses from at least one previous audience viewing of the video;

program instructions to receive input from a current audience viewing the video, wherein the input includes current viewer emotion and sentiment responses to the video;

program instructions to determine that there is an intermission in the video;

program instructions to associate the plurality of associated viewer responses from the at least one previous audience viewing and the current viewer emotion and sentiment responses with one or more segments of the video;

program instructions to identify a segment of the video associated with a type of viewer reaction based on emotion and sentiment recognition;

program instructions to retrieve additional media content based on the identified video segment;

program instructions to determine a segment of the additional media content that exceeds a threshold of similarity with the segment of the video; and program instructions to create a video clip that includes the segment of the additional media content.

14. The computer system of claim 13, further comprising program instructions stored on the one or more computer readable storage media for execution by at least one of the one or more computer processors, to:

rank a plurality of video clips, including the video clip, based on similarity with the segment of the video; and send the ranked plurality of video clips for presentation to a current audience viewing the video.

15. The computer system of claim 13, further comprising program instructions stored on the one or more computer readable storage media for execution by at least one of the one or more computer processors, to:

store one or more results used to create the video clip, wherein the one or more results include the retrieved information about the video, the association between viewer emotion and sentiment responses and segments of the video, the identified segment of the video associated with the type of viewer reaction, the additional media content, the segment of the additional media content that exceeds the threshold of similarity with the segment of the movie, the created video clip.

16. The computer system of claim 13, wherein the additional media includes a full-length movie, a movie trailer, a full-length television show, and a television show trailer.

17. The computer system of claim 14, further comprising program instructions stored on the one or more computer readable storage media for execution by at least one of the one or more computer processors, to:

associate a computing device with a user in the current audience; and send the ranked plurality of video clips to the computing device of the user.

* * * * *